(12) United States Patent
Breen

(10) Patent No.: US 9,511,654 B2
(45) Date of Patent: Dec. 6, 2016

(54) TONNEAU COVER

(75) Inventor: Graeme Breen, Deakin (AU)

(73) Assignee: TULLI PTY LTD, Clayfield Queensland (AU)

(*) Notice: Subject to any disclaimer, the term of this patent is extended or adjusted under 35 U.S.C. 154(b) by 262 days.

(21) Appl. No.: 14/116,987

(22) PCT Filed: May 10, 2012

(86) PCT No.: PCT/AU2012/000504
§ 371 (c)(1),
(2), (4) Date: Sep. 3, 2014

(87) PCT Pub. No.: WO2012/151632
PCT Pub. Date: Nov. 15, 2012

(65) Prior Publication Data
US 2015/0015021 A1    Jan. 15, 2015

(30) Foreign Application Priority Data

May 11, 2011 (AU) ................................ 2011901773
Apr. 11, 2013 (AU) ................................ 2013204064

(51) Int. Cl.
| | |
|---|---|
| *A44B 13/00* | (2006.01) |
| *B60P 7/08* | (2006.01) |
| *B60J 7/10* | (2006.01) |
| *F16G 11/10* | (2006.01) |
| *F16G 11/14* | (2006.01) |
| *F16B 45/00* | (2006.01) |

(52) U.S. Cl.
CPC ............. *B60J 7/104* (2013.01); *A44B 13/00* (2013.01); *B60P 7/0876* (2013.01); *F16B 45/00* (2013.01); *F16G 11/103* (2013.01); *F16G 11/143* (2013.01); *Y10T 24/4523* (2015.01)

(58) Field of Classification Search
CPC ........... B60J 7/104; F16B 45/00; A44B 13/00; F16G 11/143; F16G 11/103; B60P 7/0876; Y10T 24/4523
USPC ......... 24/300, 588.1, 600.9, 130; 296/100.15
See application file for complete search history.

(56) References Cited

U.S. PATENT DOCUMENTS

| | | | |
|---|---|---|---|
| 3,636,594 A | 1/1972 | Faivre | |
| 4,178,661 A | 12/1979 | Klein | |
| 4,831,692 A * | 5/1989 | Chuan | F16G 11/00 24/129 B |
| 5,317,788 A | 6/1994 | Esposito et al. | |

(Continued)

FOREIGN PATENT DOCUMENTS

| | | |
|---|---|---|
| GB | 2270109 A | 3/1994 |
| WO | 2012151632 A1 | 11/2012 |

*Primary Examiner* — Joseph D Pape
*Assistant Examiner* — Dana Ivey
(74) *Attorney, Agent, or Firm* — Miller, Matthias & Hull LLP

(57) ABSTRACT

The present invention is directed to a cord fixture for attachment to a cord. The cord fixture includes a body having at least one side wall, and a slot in the at least one side wall for retaining the cord therein when the cord is in a fixed condition. The slot has a neck portion and an enlarged end portion adjacent the neck portion. The neck portion is configured to guide the cord into the enlarged end portion such that the cord can be releasably retained within the enlarged end portion. The present invention is directed to the cord fixture for attachment to a cord attached to a tonneau cover for a trailer or vehicle.

18 Claims, 13 Drawing Sheets

(56) References Cited

U.S. PATENT DOCUMENTS

| | | | |
|---|---|---|---|
| 5,542,462 A | | 8/1996 | Elsenheimer |
| 5,630,257 A | * | 5/1997 | Brody .................. B60P 7/0823 24/130 |
| 5,682,652 A | | 11/1997 | Brody et al. |
| 6,012,204 A | * | 1/2000 | Roethler ............... B60P 7/0823 24/129 R |
| 6,340,198 B1 | | 1/2002 | Benites |
| 7,596,838 B1 | | 10/2009 | Bulmer |
| 2007/0057528 A1 | | 3/2007 | Fox |
| 2010/0219657 A1 | | 9/2010 | Kinley |
| 2011/0126382 A1 | | 6/2011 | Kirkham |

\* cited by examiner

TONNEAU COVER

CROSS-REFERENCE TO RELATED APPLICATIONS

This application is a 35 USC §371 U.S. national stage filing of International Patent Application No. PCT/AU2012/000504 filed on May 10, 2012, and a 35 USC §120 a continuation-in-part of International Application No. PCT/AU2012/000504 filed on May 10, 2012, claiming priority under the Paris Convention to Australian Provisional Patent Application No. 2013204064 filed on Apr. 11, 2013, and Australian Provisional Patent Application No. 2011901773 filed on May 11, 2011.

FIELD OF THE DISCLOSURE

The invention described herein relates to a cord fixture in general. In particular, the invention is directed to a cord fixture which can be used with a tonneau cover for a trailer or vehicle.

BACKGROUND OF THE DISCLOSURE

A cover can be used to protect cargo in a trailer during transit or to protect the body of a vehicle or trailer. During transit and in rough weather conditions, it is desirable for the cover to be secure and/or water resistant.

Existing methods of covering a cargo, trailer and/or vehicle include using cargo nets, tarpaulins or a combination of the two.

Cargo nets generally comprise a mesh made from one or more elastic ropes and a plurality of fixed position hooks arranged around the periphery of the mesh for securing the cargo net. These cargo nets can become easily tangled. They are difficult to untangle before use and can catch unintentionally on protruding objects when being secured. Whilst the cargo net may be able to secure the cargo in a trailer, it is not water resistant and the cargo may become damaged when exposed in certain weather conditions, such as rain, snow, hail, etc.

A sheet of material such as a tarpaulin can be used to protect the cargo, trailer and/or vehicle in rough weather conditions. However, tarpaulins are difficult to secure and require the use of separate rope, cords or nets such as cargo nets to tie it down.

Arranging a cover for cargo, trailers and/or vehicles using the tarpaulins, separate ropes, cords and/or cargo nets can be a time consuming and frustrating exercise, especially when covering a large area.

Cords such as bungee/elastic cords, ropes, lines, chains or the like can be used in many different applications. For example, cords can be used to tie objects together, secure or fix one object relative to another, secure or fix one or more objects in a desired position, move one or more objects in a desired manner and so on.

When using cords, it is often desirable to fix a portion (such as an end) of a cord relative to an object or another portion of the cord. In some cases, knots can be tied in the cord to fix the cord to itself and/or another object. Alternatively, cord fixtures can be used apply the cord in a desired manner.

One existing cord fixture is described in U.S. Pat. No. 5,682,652. U.S. Pat. No. 5,682,652 describes a pair of hooks which can be mounted on a cord. The hooks each have a cylindrical tubular member slidable along a cord and a flared slot for retaining a portion of the cord. However, in some cases the cord may not be properly held in place by the slot, thereby causing the cord to undesirably become dislodged from the hook.

It is an aim of the invention to provide a tonneau cover which overcomes or ameliorates one or more of the disadvantages or problems described above, or which at least provides the consumer with a useful choice.

SUMMARY OF THE DISCLOSURE

According to one aspect, the invention provides a tonneau cover for a trailer or vehicle, the cover comprising a flexible sheet, and a plurality of elongate members, each elongate member being connected to the flexible sheet and having a fastener associated therewith, the elongate members and/or fasteners being configured to allow a separation between the flexible sheet and the fastener to be varied, wherein each fastener is adapted for engagement with the trailer or vehicle to hold the cover relative to the trailer or vehicle, and wherein each fastener has a handle for receiving a portion of a user's hand so as to assist the user to position each fastener relative to the trailer or vehicle.

Advantageously, each elongate member can be adjusted independently such that the corresponding fastener can be attached to any suitable attachment point on the trailer or vehicle. Such a configuration allows the tonneau cover of the present invention to be more versatile as it can be used on any trailer or vehicle.

Moreover, the handle facilitates the user to grip and move the fastener to an appropriate location for attachment to the trailer or vehicle. In addition, the handle also allows the user to conveniently tension the elongate member to an adequate extent so as to secure a load on the trailer or vehicle.

Preferably, the handle is a ring shaped portion having an opening to allow the user to insert his finger therethrough.

Typically, the flexible sheet is water impermeable. The flexible sheet may be made from any suitable material. For example, the flexible sheet may be plastic or made from a fabric such as a woven synthetic fabric. Preferably, the fabric is coated with polyethylene.

The flexible sheet may be any suitable shape or size to accommodate the trailer or vehicle. For example, the flexible sheet may be circular, rectangular, square or irregular in shape.

The properties of the flexible sheet may vary depending on the specific application. For example, the thickness of the flexible sheet may vary and the flexible sheet may be thicker for more heavy duty applications. Similarly, for woven fabrics, the denier and weave may vary, and for coated sheets, the thickness and/or type of coating may vary.

The flexible sheet may or may not be resilient. The flexible sheet may be made from a resilient material to provide better coverage over uneven surfaces. One advantage of having the flexible sheet made from a resilient material is that the flexible sheet can be tightly arranged over the trailer or vehicle.

Preferably, the edge of the flexible sheet is strengthened by strengthening members. Any suitable strengthening member may be used. For example, a cable, wire or cord may be sewn into the edge of the flexible sheet to provide reinforcement.

Preferably, each elongate member has a first end and a second end. Each elongate member may be integral with or separately formed from the flexible sheet. Further, the elongate members may be permanently attached to the flexible sheet or removably attached to the flexible sheet. In one embodiment, each elongate member has a sheet attachment hook for removable attachment to the flexible sheet although any attachment mechanism may be used to removably attach the elongate member to the flexible sheet such as clips, snaps, carabiners or other biased devices.

In one embodiment, the elongate members are arranged about a periphery of the flexible sheet and attached to the flexible sheet. Preferably, the elongate members are substantially evenly spaced apart from one another.

Typically, the first end of each elongate member is attached to the flexible sheet via an attachment portion. The attachment portion may be positioned on the flexible sheet or adjacent the flexible sheet. For example, the attachment portion may comprise an eyelet positioned on the flexible sheet through which the first end of an elongate member may be attached. Alternatively, the attachment portion may comprise a ring through which the first end of an elongate member is attached. The ring may be attached to the flexible sheet via a linking portion. In one embodiment, the linking portion is a sleeve portion. The sleeve portion may be sewn onto the flexible sheet and the ring may be inserted through the sleeve portion for attachment thereto. Preferably, the attachment portions are positioned along the periphery of the flexible sheet.

Preferably, each attachment portion comprises a ring portion, the ring portion having a first part attached to the flexible sheet either directly or indirectly through a linking portion, and a second part attached to a respective first end of an elongate member. The ring may be any suitable shape. For example, the ring may be triangular, rectangular, circular, or have an irregular shape. Preferably, the ring is substantially shaped like the letter 'D', hereinafter referred to as a D-shaped ring portion.

Preferably, the flexible sheet is reinforced at a portion around the attachment portion. For example, the flexible sheet may be reinforced by using an additional layer of material around the attachment portion. Another advantage of the additional layer of material is that it distributes the load from the respective elongate member over a larger area on the flexible sheet.

The ring portion may be fastened to the flexible sheet using any suitable method or means. For example, the ring portion may be attached to the flexible sheet using adhesive, clamps, pins, clips, staple, or any suitable attachment means. Preferably, a part of the ring portion is sewn into the flexible sheet.

The ring portion can be made from any suitable material. For example, the ring portion may be plastic or metallic.

In one embodiment, the D-shaped ring portion is inserted into a linking portion in the form of a sleeve and the linking portion is sewn into the periphery of the flexible sheet. The D-shaped ring portion is inserted into the sleeve of the linking portion along a straight part of the D-shaped ring portion, and the D-shaped ring portion is attached to the first end of the elongate member on a curved part of the D-shaped ring portion. The advantage of such an arrangement is that the first end of the elongate member would be free to move along the curved part of the D-shaped ring portion without affecting the orientation of the flexible sheet.

The ring portion can be any suitable size. Preferably, the ring portion is sized according to the thickness of each elongate member.

The elongate members can be of any suitable length and thickness. Preferably, the length and thickness of the elongate members are determined based on the intended application. For example, the thickness of each elongate member is typically based on the size of the flexible sheet, the required strength of the attachment to the ring portion, the securing force to be applied to the flexible sheet and any required extension of the elongate member for a given force applied to the second end of the elongate member.

The length of the elongate members is typically based on the range of the variable separation between the flexible sheet and the fastener.

Typically, the elongate members are resilient or elastic. The elongate member can be made from any suitable material such as rubber. The elongate member may have a sheath. The sheath can be made from any suitable material such as plastic, polyester, nylon, acrylic, spandex, or the like. The sheath may assist in strengthening and protecting the elongate member. More preferably, the sheath provides physical and UV protection to the elongate member.

Alternatively, the elongate member may be a strap, a flap, a belt, a chain, a piece of rope, or the like. The elongate member can be made from any suitable material, for example, rubber, plastic, fabric, metals, or a combination of different materials.

The fastener can be any suitable fastener. For example, the fastener can be a hook, a clamp, a multi-part device, or the like.

The separation between the flexible sheet and each fastener can be varied in a number of different ways. For example, the position of the fastener along the elongate member may vary, each elongate member may be made from a resilient material allowing the elongate member to stretch and retract, and/or each elongate member may have an adjustable folded portion, wherein the size of the folded portion may be adjusted to vary the overall length of the elongate member. Any one or more of these methods may be used to vary the separation between the flexible sheet and each fastener.

In one embodiment, the fastener is a hook and the hook is attached to an elongate member. The attachment position of the hook along the elongate member is adjustable to vary the separation distance between the flexible sheet and the hook. Preferably, the elongate member is also made from a resilient material such that the separation distance between the flexible sheet and each hook can be varied by stretching the elongate member once the hook is secured into a position along the elongate member.

The position of the fastener along the elongate member can be adjusted in several different ways.

In one embodiment, the fastener comprises a hollow portion having first and second open ends to allow the insertion of an elongate member therethrough. The hollow portion has a substantially V-shaped slot with a first end and a second end, the first end of the V-shaped slot being positioned at the first open end of the hollow portion and the second end of the V-shaped slot being positioned at or adjacent the second open end of the hollow portion, and the width of the V-shaped slot being reduced from the first end towards the second end. The V-shaped slot may have a closed second end.

To secure the fastener at a desired position on the elongate member, the second end of the elongate member is inserted from the second open end of the hollow portion to the first open end of the hollow portion. The fastener is then moved along the elongate member to the desired position such that a length of the elongate member protrudes from the first open end of the hollow portion. To secure the fastener at the desired position on the elongate member, the length of the elongate member which protrudes from the first open end of the hollow portion is pulled outwardly in a direction transverse to the orientation of the V-shaped slot to force the elongate member into the V-shaped slot from the first end of the V-shaped slot and towards the second end of the V-shaped slot. As the width of the V-shaped slot narrows from the first end to the second end, the elongate member becomes more and more tightly clamped within the V-shaped slot. The clamping of the elongate member within the V-shaped slot secures the fastener relative to the elongate member at the desired position on the elongate member.

To release the fastener from the desired position, the elongate member is pulled out of the V-shaped slot to allow the hollow portion to freely slide along the elongate member.

The hollow portion may be of any suitable shape. For example, the hollow portion can be rectangular, tubular, cylindrical, etc. Preferably, the hollow portion is cylindrical.

Preferably, the first end of the V-shaped slot is suitably sized to receive the elongate member in the thickness direction of the elongate member.

Alternatively, the slot in the hollow portion may have one or more projections such as one or more teeth for gripping onto the elongate member when it is forced into the slot by pulling its second end in a transverse direction to the slot.

Preferably, the elongate member has an enlarged portion at the second end to prevent the hollow portion from sliding off the elongate member after insertion.

In another embodiment, the fastener has a clamp which can be tightened at a desired position on the elongate member. The clamp may have any suitable configuration, for example, the clamp may be spring loaded or screwed tightened.

According to another aspect of the invention, there is provided a kit for assembling a tonneau cover for a trailer or vehicle, the kit comprising a flexible sheet, and a plurality of elongate members for attachment to the flexible sheet, each elongate member having a fastener associated therewith, the elongate members and/or fasteners being configured to allow a separation between the flexible sheet and the fastener to be varied when the elongate members are attached to the flexible sheet, wherein each fastener is adapted for engagement with the trailer or vehicle to hold the tonneau cover relative to the trailer or vehicle, and wherein each fastener has a handle for receiving a portion of a user's hand so as to assist the user to position each fastener relative to the trailer or vehicle.

According to yet another aspect of the invention, there is provided a fastener for fastening a cover to a trailer or vehicle, the fastener having an elongate hollow portion for receiving and securing a cord, and a hook portion located proximate a first end of the elongate hollow portion, the hook portion having a tip facing a second end of the elongate hollow portion, the second end of the elongate hollow portion extending substantially beyond the tip of the hook portion, wherein the fastener has a handle projecting from or forming part of the hook portion for receiving a portion of a user's hand so as to assist the user to position the hook portion relative to the trailer or vehicle.

The hook portion may have an arc angle of greater than 180°.

The elongate hollow portion may be a hollow tube. The elongate hollow portion may have a substantially V-shaped slot for securing the cord.

The handle portion may be a substantially ring shaped portion. The ring shaped portion may be defined in the hook portion. The ring shaped portion may be sized to receive a finger so as to facilitate positioning of the hook portion on a trailer or vehicle.

In a further embodiment, there is further provided a buckle positioned along the elongate member to adjust a foldable portion of the elongate member to adjust the overall length of the elongate member.

According to yet another aspect of the invention, there is provided a fastener for fastening a cover to a trailer or vehicle, the fastener having an elongate hollow portion for receiving and securing a cord, and a hook portion located proximate a first end of the elongate hollow portion, the hook portion having a tip facing a second end of the elongate hollow portion, wherein the fastener has a handle projecting from or forming part of the hook portion for receiving a portion of a user's hand so as to assist the user to position the hook portion relative to the trailer or vehicle.

According to a further aspect of the invention, there is provided a cord fixture for attachment with a cord, the cord fixture including a body having at least one side wall, and a slot in the at least one side wall for retaining the cord therein when the cord is in a fixed condition, the slot having a neck portion, and an enlarged end portion, the neck portion being configured to guide the cord into the enlarged end portion such that the cord can be releasably retained within the enlarged end portion.

Advantageously, the enlarged end portion of the slot securely retains the cord therein so as to prevent accidental dislodgement of the cord when the cord fixture is in its fixed condition. Further, the slot is advantageously configured to provide a user with sensory feedback (i.e. tactile feedback) as the cord is received in the enlarged end portion so as to indicate that the cord has been inserted into the correct locking position. Moreover, the enlarged end portion of the slot evenly distributes the stresses and strains in the body of the cord fixture when the cord is under tension.

The cord may include any elongate flexible member. For example, the cord may be an elastic cord, a bungee cord, a rope, a pipe, a line, a chain, wire or the like. The cord can be made of any suitable material, such as fabric, straw, plastic, polymers, metal, or any combination thereof.

The body of the cord fixture may be any suitable shape or form. For example, the body may be a flat or curved plate. In some embodiments, the body may form part of another object, such as a container, trailer or anchor.

In one embodiment, the body includes a hollow member having a bore therethrough for receiving the cord. The hollow member may have any suitable cross-sectional shape. For example, the hollow member may have a circular, rectangular, square, triangular, or any irregular cross-sectional shape. Similarly, the bore may have any suitable cross-sectional shape. For example, the bore may have a circular, rectangular, square, triangular, or any irregular cross-sectional shape. The hollow member may be an elongate tube. The elongate tube may have a generally circular cross section with a generally circular bore therethrough. Further, the body may be slidable along the cord when the cord is in an unfixed condition.

Typically, the neck portion includes a narrowed portion of the slot. The slot may be defined by a pair of side edges. The pair of side edges may be spaced apart at one end of the slot and joined together at an opposite end of the slot. In the neck portion, the side edges may be parallel, converging/diverging, and/or one or both side edges may be curved.

In one embodiment, the neck portion of the slot may be generally V-shaped. The V-shaped neck portion may have a first open end and a second open end. The first open end may be wider than the second open end such that the side edges converge from the first open end to the second open end.

The neck portion may define a pinch point. The pinch point may be configured to prevent the cord from being dislodged from the enlarged end portion when the cord fixture is in the fixed condition. In particular, the pinch point may be defined at the second end of the neck portion. The cord or the pinch point may require some temporary deformation to allow passage of the cord.

The enlarged end portion may be of any suitable shape or form. For example, the enlarged end portion may be generally circular, square, rectangular, triangular, star shaped, or have any irregular shape. Preferably, the enlarged end portion is generally circular. The enlarged end portion is typically sized to match or closely match the diameter of a standard cord size, for example a common standard bungee cord size.

The enlarged end portion may be located in any suitable position relative to the neck portion. For example, the enlarged end portion may be positioned in line or transversely to a lengthwise direction of the neck portion. The enlarged end portion may be in line with a centerline of the neck portion. Alternatively, the enlarged end portion may be positioned to one side of the neck portion. Preferably, the enlarged end portion is proximate the second end of the neck portion.

In one embodiment, the enlarged end portion of the slot includes two parts having a narrowed portion or secondary pinch point therebetween. The two parts may be circular or any other suitable shape (e.g. square, rectangular, triangular, star shaped, or have any irregular shape). The two parts may be arranged in any suitable position and orientation with respect to one another. For example, the two parts may be arranged adjacent the second end of the neck portion. The two parts may be arranged in series and in line along a lengthwise direction of the slot. Alternatively, the two parts may be arranged transversely to the lengthwise direction of the slot. In one example, the two parts may be arranged on one or either side of the neck portion.

The two parts may be any suitable size. One part may be larger or smaller than the other part. Typically, a first part located immediately adjacent the neck portion is larger in diameter than a circular part located immediately adjacent the first circular part.

Advantageously, a single cord fixture is configured to accommodate cords of different diameters. In particular, a first cord with a larger diameter can be inserted into the first part of the enlarged end portion. If the diameter of the second part of the neck portion is too small to receive the first cord, the first cord is retained in the first part rather than the second part. Similarly, a second cord with a smaller diameter can be inserted into the second part. If the diameter of the first part is too large to securely retain the second cord, the second cord is passed through the first part until it is received in the second part, which would be sized to securely retain the second cord. In this manner, the single cord fixture may advantageously retain either the first cord or the second cord at any one time. Alternatively, the cord fixture may advantageously retain both the first cord and the second cord simultaneously.

The enlarged end portion may have more than two parts as discussed above. Indeed, the enlarged end portion may include three, four or more parts, each separated from an adjacent part by a narrow portion and each having a different size (e.g. diameter) such that a cord can be inserted into the most suitably sized part of the enlarged end portion to be securely retained therein. Advantageously, a single cord fixture can thereby retain one or more cords of different diameters independently or simultaneously.

In another embodiment, the two or more parts may be of the same size. Advantageously, the cord fixture can thereby retain one or more cords of the same diameter independently or simultaneously.

The cord fixture may further include a fastener portion projecting from the body. The fastener portion may include one or more hooks, clamps, clips, pins, rings, or the like for fastening the cord fixture to another object. Typically, the fastener portion includes a hook. The hook may have an arc angle of greater than 180°.

The fastener portion may be integral with the body of the cord fixture. The cord fixture may include one or more handles. Each handle may be of any suitable shape or form. For example, a handle may be a rod, bar, hook, stub or the like so as to facilitate holding and orientating the cord fixture and fastener portion. Typically, the handle has an eyelet sized for receiving a portion of a user's finger. The fastener portion may include a handle. The handle may be integral with the fastener portion.

The fastener portion may be located in any suitable position on the body of the cord fixture. The fastener portion may be located adjacent or spaced from the slot, and/or located on one side or end of the body opposite to the slot.

The cord fixture may include two or more slots for retaining two or more portions of a single cord, or two or more cords concurrently. In particular, the body of the cord fixture may include two hollow tubes, each hollow tube having a side wall including a slot for retaining a cord therein. In another embodiment, the body of the cord fixture may include a plate, the plate defining two or more slots for retaining two or more cord portions therein.

The cord fixture may be made from any suitable material. For example, plastic, metal, wood, composite material. Typically, the cord fixture is made from plastic. The cord fixture may be moulded in one piece.

According to another aspect of the invention, there is provided a method of attaching a cord fixture to a cord, the method including
 inserting the cord into a slot in a side wall of the cord fixture,
 guiding the cord via a neck portion of the slot into an enlarged end portion of the slot, and
 releasably retaining the cord within the enlarged end portion of the slot.

In order that the invention may be more readily understood and put into practice, one or more preferred embodiments thereof will now be described, by way of example only, with reference to the accompanying drawings.

DETAILED DESCRIPTION OF THE DISCLOSURE

Figure 1:
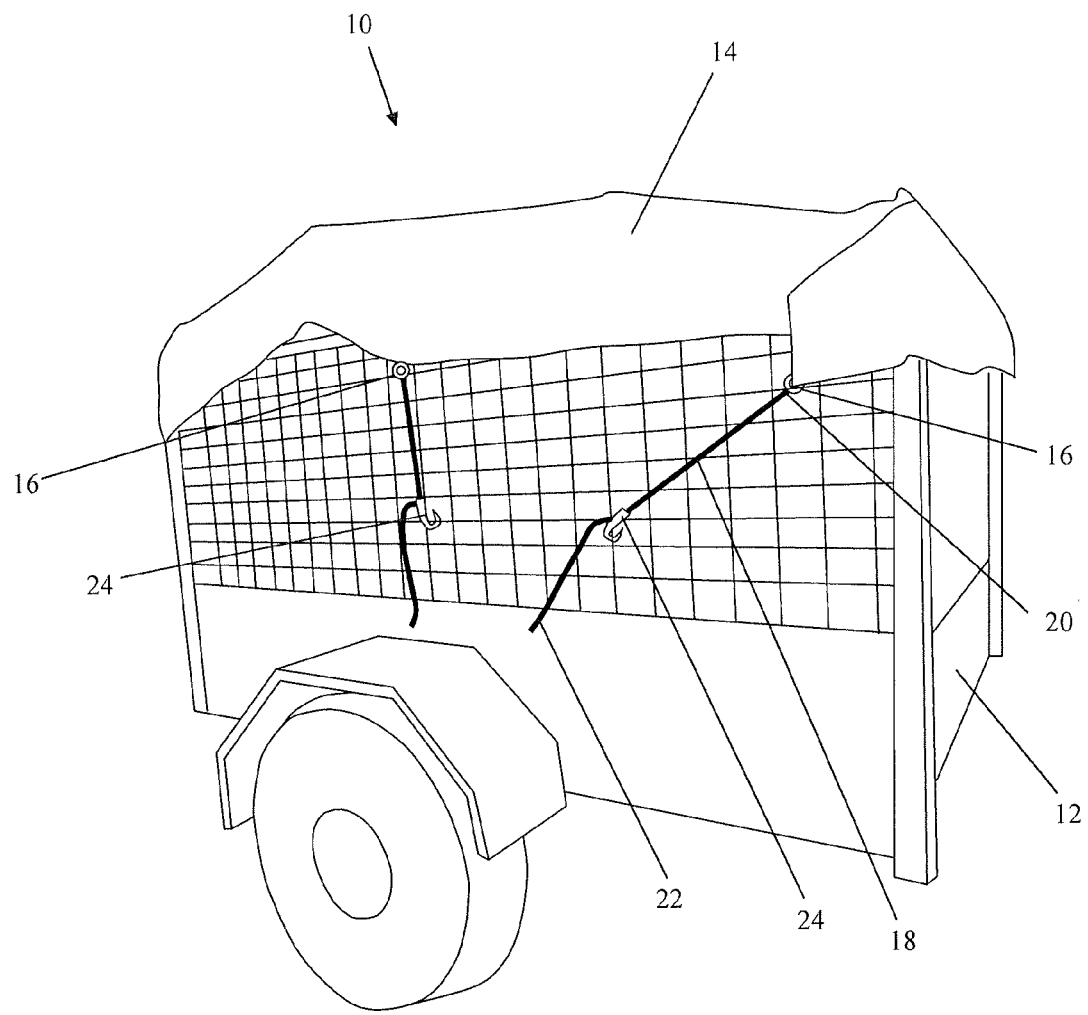
FIG. 1 shows a tonneau cover according to one embodiment of the invention being used on a vehicle trailer.
Figure 4:
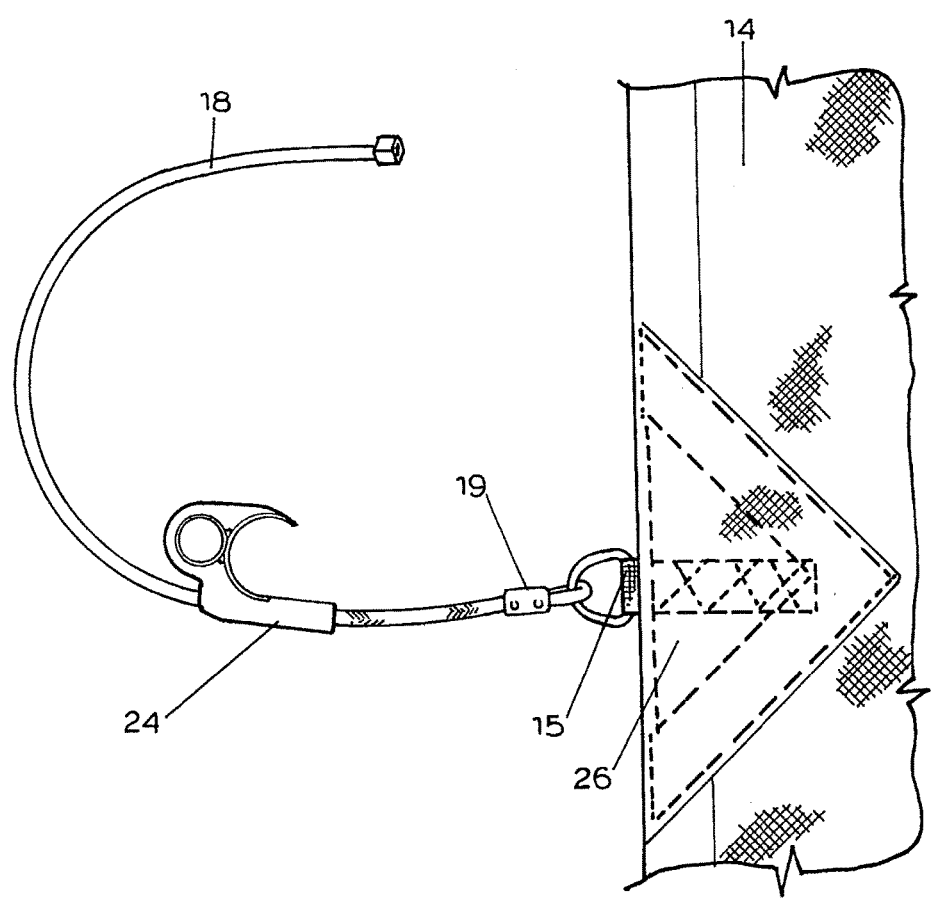

FIG. 1 illustrates a tonneau cover 10 being used to cover a load in a vehicle trailer 12. The tonneau cover 10 having a flexible sheet 14 for covering the load in the trailer 12. The tonneau cover 10 has a plurality of attachment portions each comprising a ring 16. The plurality of attachment portions being arranged adjacent the periphery of the flexible cover 14 and attached to the flexible cover 14 by a sleeve portion 15 (FIG. 4).

Each ring 16 may be shaped substantially like a letter 'D', having a straight portion and a curved portion. The straight portion of each D-shaped ring is inserted through a sleeve portion 15 (FIG. 4), which is sewn into the flexible sheet 14 for attachment thereto.

The tonneau cover 10 further provides a plurality of elastic elongate members 18. Each elongate member 18 has a first end 20 and a second end 22. The first end 20 of each elongate member 18 is attached to the curved portion of a D-shaped ring 16. This arrangement allows the orientation of each elongate member 18 to change with respect to the flexible sheet 14, without affecting the orientation of the flexible sheet 14. Such a feature allows the application of the tonneau cover to be versatile as the orientation of each elongate member can be changed according to the shape and size of the trailer, the load and/or the vehicle without affecting the position and orientation of the flexible sheet 14.

Each elongate member 18 has a fastener 24 associated therewith. The fasteners 24 secure the tonneau cover 10 to the trailer 12 by providing attachment means to the body of the trailer 12.

The position of each fastener 24 along its respective elongate member 18 can be adjusted. This will be discussed further in relation to FIGS. 4 to 9.

Figure 2:
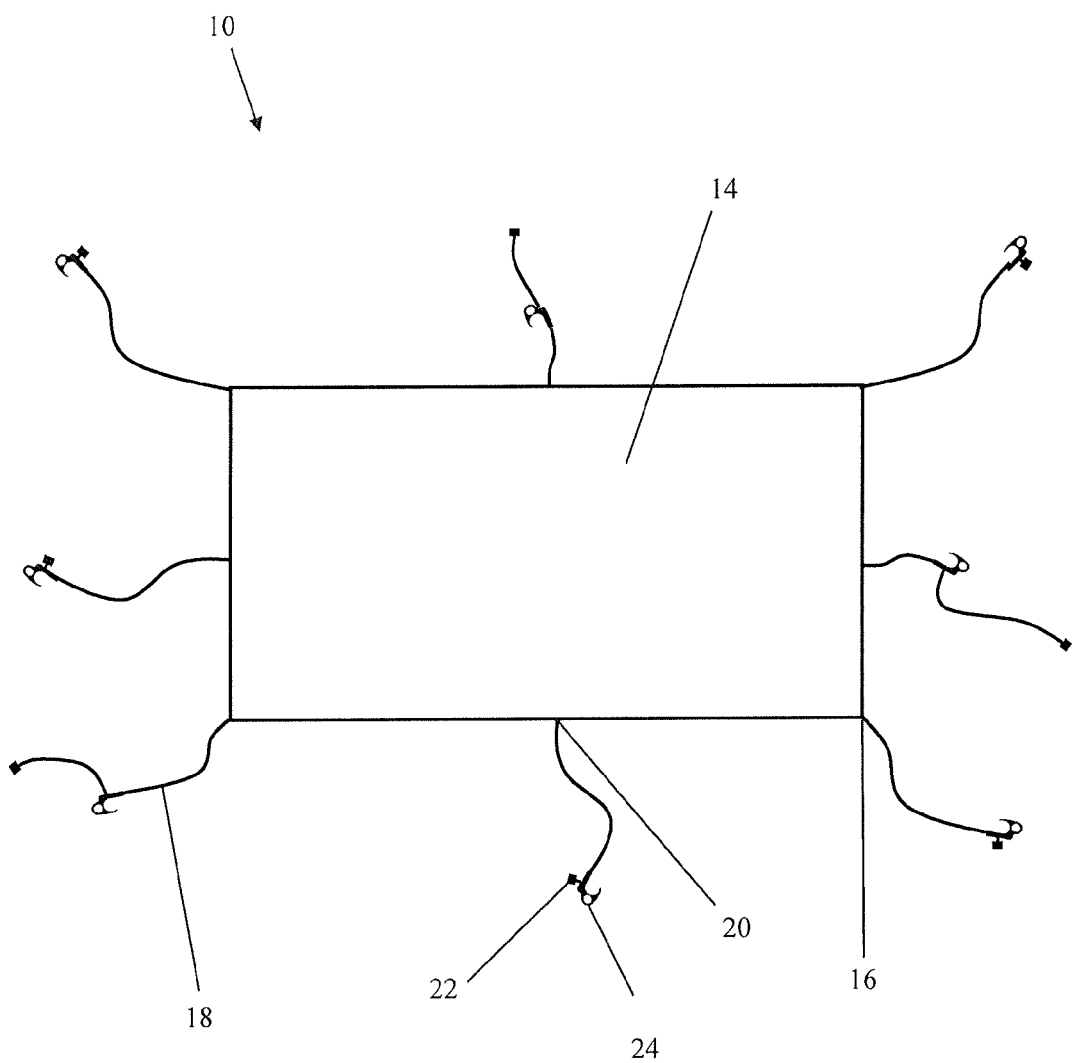
FIG. 2 shows a tonneau cover according to an embodiment of the invention.

FIG. 2 illustrates a tonneau cover 10 having a flexible sheet 14, eight elongate members 18 each being attached to the flexible sheet 14 via an attachment portion 16. The elongate members 18 are evenly spaced around the periphery of the flexible sheet 14. In particular, the elongate members 18 are attached at each corner and at a mid-point along each edge of the flexible sheet 14. There is further provided a fastener 24 associated with each elongate member 18. The position of the fastener 24 along its respective elongate member is adjustable.

Figure 3:
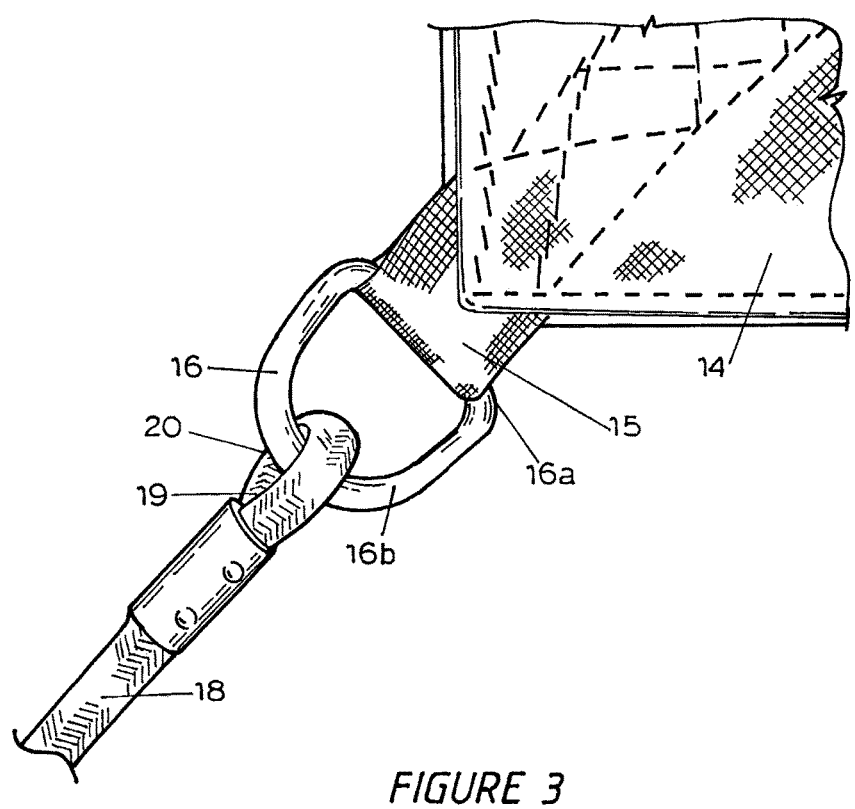
FIGS. 3 to 5 illustrate attachment portions of the cover according to one embodiment of the invention.
Figure 5:
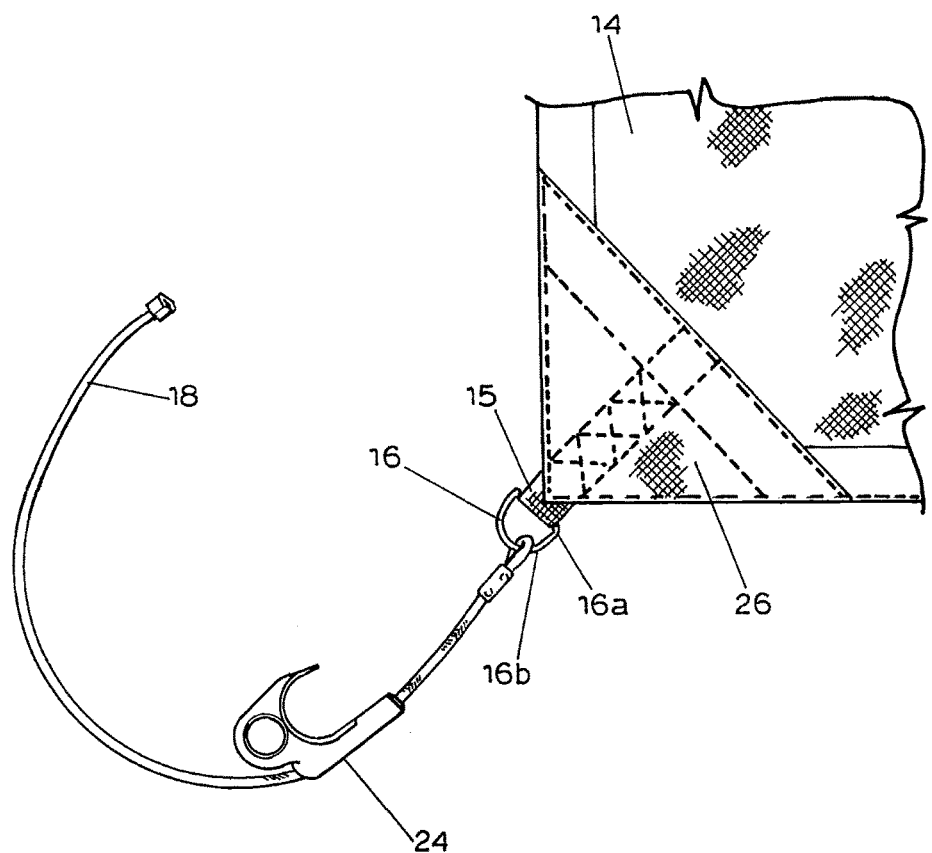

FIG. 3 illustrates an attachment portion at a corner of the flexible sheet 14, which facilitates the attachment between the flexible sheet 14 and an elongate member 18. As mentioned, the attachment portion comprises a D-shaped ring 16. The D-shaped ring 16 has a straight portion 16a (hidden) and a curved portion 16b. The straight portion 16a is inserted through a sleeve portion 15 and the sleeve portion 15 is sewn into the flexible sheet 14 for attachment thereto (FIGS. 4 and 5). An end portion of the elongate member 18 is folded over itself to form a loop 19 at the first end 20 of the elongate member 18. The loop 19 is wrapped around the curved portion 16b of the D-shaped ring 16 as shown in FIG. 5 for attachment thereto. This attachment allows the first end 20 to be easily movable along the curved portion 16b of the D-shaped ring so that the orientation of the elongate member 18 can be easily adjusted without affecting the position or orientation of the flexible sheet 14.

As shown in FIGS. 4 and 5, there is further provided a reinforcement layer 26 covering a portion of the flexible sheet 14 immediately adjacent the D-shaped ring 16. FIG. 4 shows a reinforcement layer 26 being positioned adjacent a D-shaped ring 16 along an edge of the flexible sheet 14. FIG. 5 shows a reinforcement layer 26 being positioned adjacent a D-shaped ring 16 at a corner portion of the flexible sheet 14. The reinforcement layer 26 is sewn onto the flexible sheet 14. To cover the trailer 12, the tonneau cover 10 is placed over the trailer 12 and secured in place by attaching the fasteners 24 to the trailer 12. The length of the elongate members 18 between each fastener 24 and the respective D-shaped ring 16 is adjusted to ensure that the flexible sheet 14 is tightly secured to the trailer 12. Generally, tension in the elongate members 18 is transferred to the flexible sheet 14 through the attachment portions. Therefore, the area immediately adjacent the attachment portions on the flexible sheet 14 should be designed to be capable of carrying a certain load. The reinforcement layer 26 not only strengthens the flexible sheet 14 around the attachment portions, it also distributes the force acting on the flexible sheet 14 across a large area of the flexible sheet 14.

FIGS. 6A, 6B and 8 to 9 illustrate a fastener 24 associated with an elongate member 18. The fastener 24 comprises a hook portion 28 and a hollow portion 30. The hook portion 28 can be used for attachment to any suitable part of the trailer 12. The hollow portion 30 has a first open end 32 and a second open end 34. An elongate member 18 is moveably fitted through the hollow portion 30 as illustrated in the Figures.

Figure 6A:
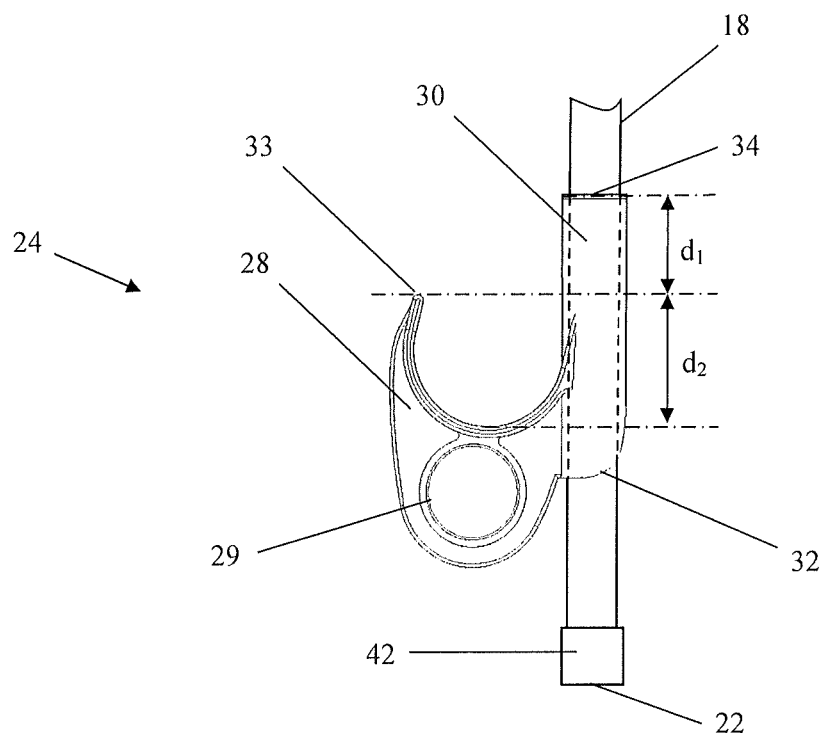
FIG. 6A shows a side view of a fastener of a tonneau cover according to one embodiment of the invention.
Figure 6B:
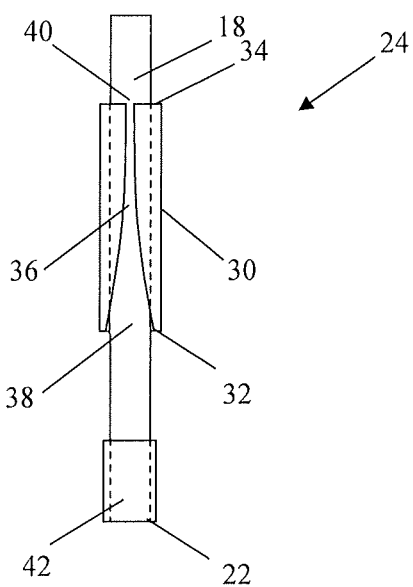
FIG. 6B shows a back view of the fastener of FIG. 6A.
Figure 8:
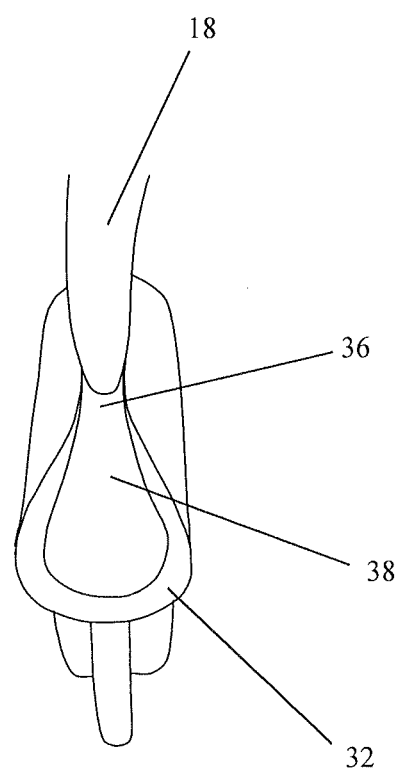
FIG. 8 illustrates an elongate member being engaged with the fastener such that the fastener is secured at a desired position along the elongate member.
Figure 9:
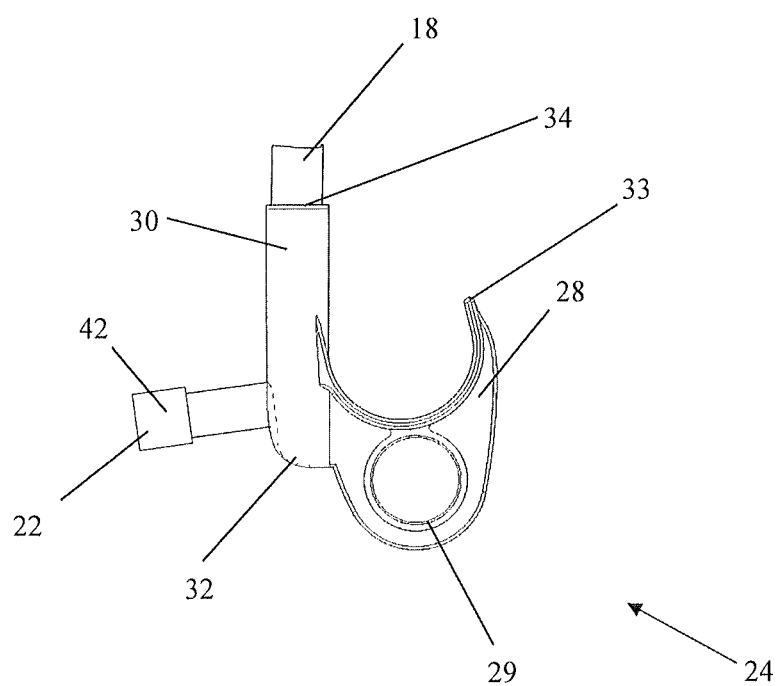
FIG. 9 shows another side view of a fastener according to an embodiment of the invention.

As shown in FIG. 6B, the hollow portion 30 has a substantially V-shaped slot 36. The V-shaped slot 36 has a first end 38 and a second end 40, the first end 38 of the V-shaped slot 36 being positioned at the first open end 32 of the hollow portion 30 and the second end 40 of the V-shaped slot 36 being positioned at the second open end 34 of the hollow portion 36. The width of the V-shaped slot 36 is reduced from the first end 38 towards the second end 40. To secure the fastener 24 at a desired position on the elongate member 18, the fastener 24 is moved along elongate member 18 to the desired position. Then, a length of the elongate member 18 which protrudes from the first open end 32 of the hollow portion 30 is forced into the V-shaped slot 36 by pulling the second end 22 of the elongate member in a direction transverse to the V-shaped slot 36 (FIGS. 8 and 9). The elongate member 18 is forced into the V-shaped slot 36 from the first end 38 of the V-shaped slot and towards the second end 40 of the V-shaped slot 36 (FIGS. 8 and 9).

As the width of the V-shaped slot 36 narrows from the first end 38 to the second end 40 (FIG. 6B), the elongate member 18 becomes increasingly tightly clamped within the V-shaped slot 36 as the second end 22 of the elongate member is being pulled. The clamping of the elongate member 18 within the V-shaped slot 36 secures the fastener 24 to the elongate member 18 at the desired position on the elongate member 18.

To release the fastener 24 from the desired position on the elongate member 18, the second end 22 elongate member 18 is pulled out of the V-shaped slot 36 by pulling the elongate member 18 in a direction from the second end 40 of the V-shaped slot 36 towards the first end 38 of the V-shaped slot. Once released from the V-shaped slot 36, the hollow portion 30 of the fastener 24 can freely slide along the elongate member 18.

Figure 7:
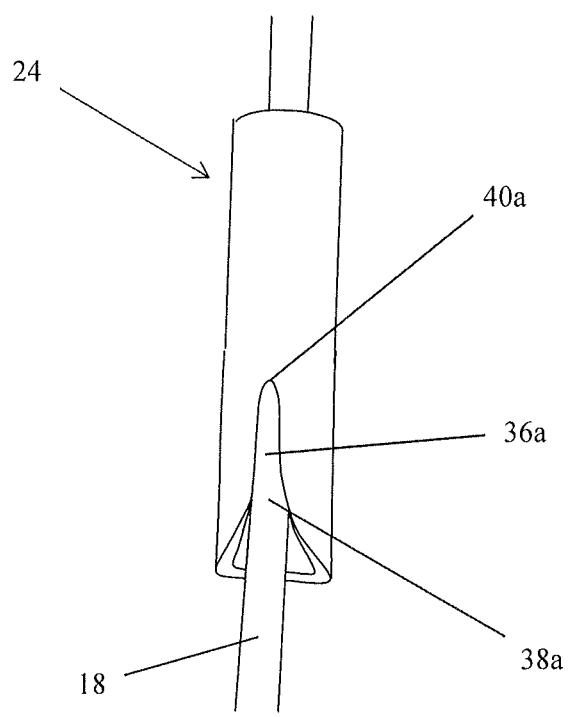
FIG. 7 shows a back view of a fastener according to another embodiment of the invention.

In FIG. 6B, the V-shaped slot 36 has two open ends. In FIG. 7, the V-shaped slot 36a has a first end 38a which is open to receive the elongate member in its thickness direction and a second end 40a which is closed. Either embodiment may be used to secure the fastener 24 at a desired location along the elongate member 18. However, providing the V-shaped slot with a closed second end 40a may be more advantageous if the fastener 24 is made of a flexible material such as plastic. This is because a closed second end 40a would prevent the elongate member 18 from being pulled out of the hollow portion of the fastener. Whereas in the embodiment as shown in FIG. 6B, the elongate member 18 may be pulled out of the hollow portion of the fastener if the second open end 40 is enlarged when a sufficiently strong force is applied to the elongate member 18.

FIG. 6A further illustrates a handle 29 in the form of a ring to assist the user to grip and move the fastener 24 to an appropriate position for attachment. The ring portion in the handle 29 advantageously allows a user to insert his/her finger into the handle for convenient and more comfortable handling of the fastener 24.

As shown in FIGS. 6A and 6B, there is further provided an enlarged portion 42 at the second end of the elongate member to prevent the fastener 28 from sliding off the elongate member 18.

One problem with using a conventional hook to secure the flexible sheet 14 to a trailer or vehicle is that the hook can easily become dislodged from an attachment point on the trailer or vehicle when the elongate member 18 is tensioned. In practice, the hook must be attachable to many different types of surfaces available on different trailers and vehicles. For example, the available attachment surfaces may be on a portion of an edge, a lip, a bar, a recess on a side of a trailer or vehicle.

When a conventional hook is attached to these available surfaces, the elongate member 18 between the hook and the flexible sheet 14 becomes tensioned. As the force from the tension in the elongate member 18 acts on one side of the conventional hook, the force from the elongate member 18 may cause the hook to rotate relative to the attachment point between the hook and the available surface, and thus become dislodged from the trailer or vehicle.

The fastener 24 (FIG. 6A to FIG. 9) according to an embodiment of the present invention is designed to prevent such dislodgement. In particular, the length of the elongate hollow portion 30 is greater than that of conventional hooks. The second open end 34 of the hollow portion 30 extends substantially beyond the tip 33 of the hook portion 28. Preferably, the end 34 of the hollow portion extends approximately 15 to 25 mm beyond the tip 33 of the hook portion 28 (i.e. 15 mm≤$d_1$≤25 mm, FIG. 6A). More preferably, the end 34 of the hollow portion extends approximately 20 mm beyond the tip 33 of the hook portion 28 (i.e. $d_1$≈20 mm, FIG. 6A). In the preferred embodiment, the depth of the hook portion 28 is approximately 20 to 25 mm (i.e. 20 mm≤$d_2$≤25 mm, FIG. 6A). Generally, the length of the hollow portion 30 would be greater for hook portions 28 having an arc with longer chord length.

The hollow portion 30 allows the direction of the sum of the forces acting on the fastener 24 to become aligned with the attachment point without excessive rotation of the hook portion 28 so as to ensure that the hook portion 28 remains attached to the trailer or vehicle.

When fastener 24 is attached to an attachment point on the trailer or vehicle, the fastener 24 stops rotating about the attachment point when the sum of the forces from the elongate member 18 acting on the fastener 24 becomes substantially aligned with the attachment point. The direction of the sum of forces from the elongate member 18 acting on the fastener 24 is in the general direction of the elongate member 18. As the hollow portion 30 of fastener 24 extends well beyond the tip 33 of the hook portion 28, the hollow portion 30 reduces the amount of rotation of the hook portion 28 that is required before the sum of the forces from the elongate member 18 acting on the fastener 24 become aligned with the attachment point, thereby preventing the hook portion 28 from becoming dislodged from the trailer or vehicle when the elongate member 18 is tensioned. (In conventional hooks, significant rotation of the hook portion is required before such an alignment can occur, which may cause the conventional hook to become dislodged from the trailer or vehicle.)

The hook portion 28 also has an arc angle of greater than 180° to prevent dislodgement of the hook portion 28 from the trailer or vehicle.

The ring shaped handle 29 is sized to receive a finger of a user to facilitate the user in positioning the hook portion 28 relative to an attachment point on the trailer or vehicle.

Figure 10:
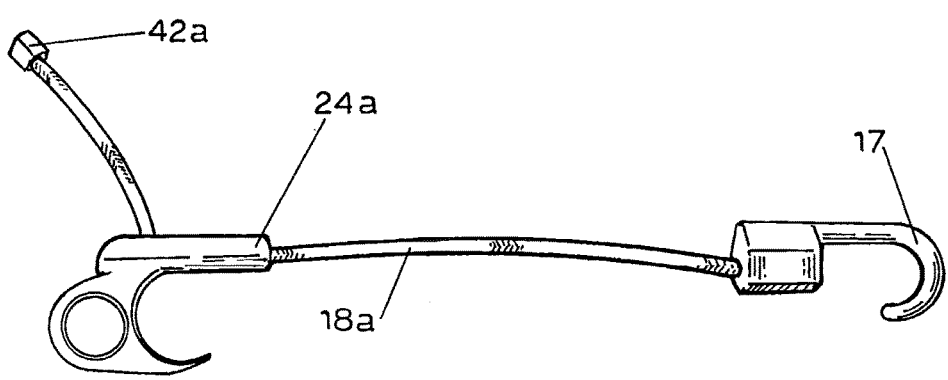
FIG. 10 illustrates a detachable elongate member according to another embodiment of the invention.

FIG. 10 illustrates an elongate member 18a, which is attachable to and detachable from the flexible sheet 14. The elongate member 18a has a sheet attachment hook 17 which is capable of being inserted into an opening in the attachment portion. For example, the sheet attachment hook 17 can be inserted into a D-shaped ring 16 for attachment thereto.

The elongate member 18a also has a fastener 24a associated therewith and an enlarged end 42a to prevent the fastener 24a from sliding off the elongate member 18a. The fastener 24a is secured at a desired location along the elongate member 18a in the same manner as described above in relation to FIGS. 6A, 6B and 7 to 9.

The advantage of providing attachable and detachable elongate members is that the number of elongate members used to hold the flexible sheet 14 can be easily adjusted depending on the size and nature of the load to be covered. For example, the flexible sheet 14 can be provided with a plurality of attachment portions and the user can attach as few or as many elongate members 18a to the flexible sheet 14 in order cover a load in a trailer or vehicle.

Figure 11:
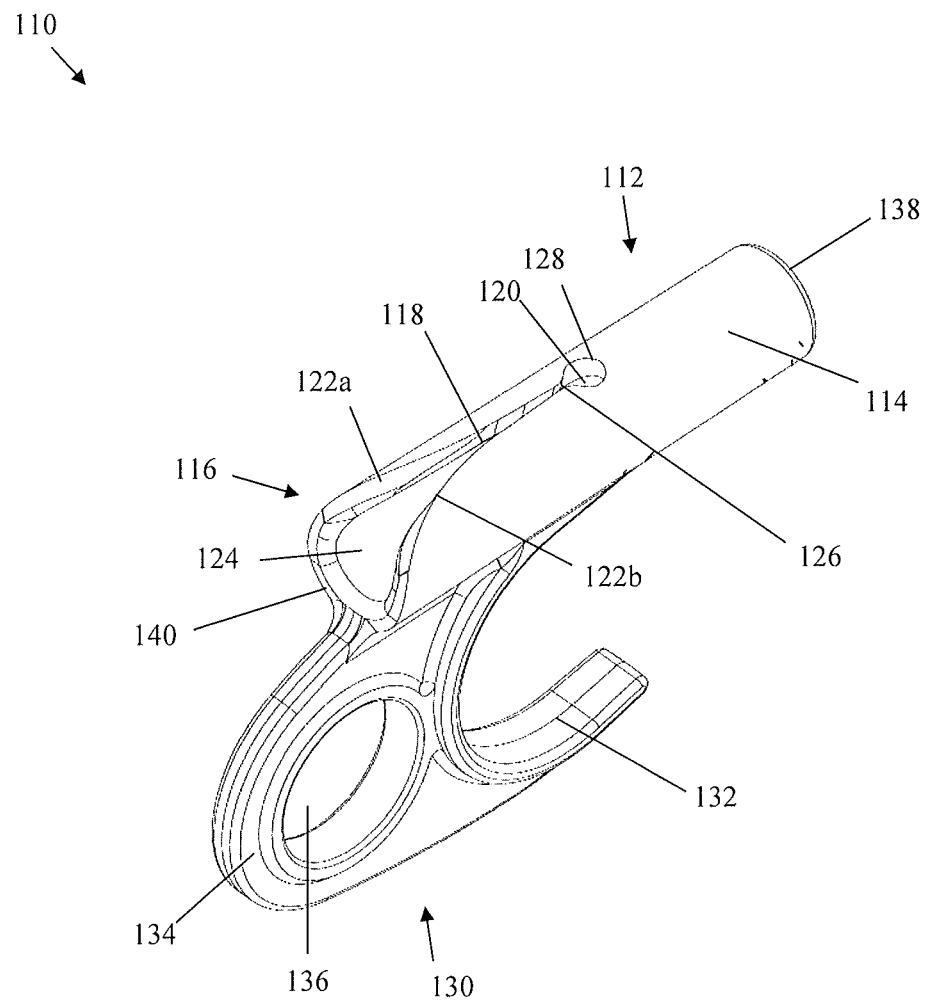
FIG. 11 is a perspective view of a cord fixture according to one embodiment of the present invention.

FIG. 11 illustrates an alternative cord fixture 110 for attachment with a cord (not shown). The cord fixture 110 includes a hollow body 112 in the form of a hollow tube defining a bore. The hollow body 112 has a side wall 114, and a slot 116 in the side wall 114 for retaining the cord when the cord is in a fixed condition. In particular, the slot 116 has a neck portion 118 and an enlarged circular end portion 120 adjacent one end of the neck portion.

When attaching a cord to the cord fixture 110, one end portion of the cord is first inserted through the bore of the hollow body 112 and then transversely inserted into the slot. In the slot, the end portion of the cord is guided through the neck portion 118 into the enlarged end portion 120 such that the cord can be releasably retained within the enlarged end portion 120.

The slot 116 is defined by a pair of side edges 122a, 122b. The side edges 122a, 122b converge from an open end 124 of the slot 116 to a pinch point 126 of the slot 116 thereby defining a generally V-shaped neck portion 118. The side edges 122a, 122b then diverge to define a circular opening (i.e. the enlarged circular end portion 120) before joining together at a closed end 128 of the slot 116.

A hook portion 130 projects from a side of the hollow body 112 opposite to the slot 116. The hook portion 130 includes a hook 132, which has an arc angle of greater than 180°, and a handle 134. The handle 134 defines an eyelet 136 sized to receive a portion of a user's finger.

The cord fixture 110 is moulded from plastic in one piece. A small level of flexibility may be present in the side edges 122a, 122b of the slot 116 to facilitate the cord passing through the slot 116 in use.

When using cord fixture 110, a cord can be attached to the cord fixture by first inserting the cord into the bore of the hollow body 112 by threading an end portion of the cord from a first end 138 to a second end 140 of the hollow body 112. Then, the end portion of the cord near the second end 140 of the hollow body is orientated in a direction transverse to the axis of the hollow body 112 and inserted into the slot 116. The neck portion 18 of the slot 16 then guides the cord into the enlarged circular end portion 120 so that it can be securely retained therein.

Once the cord is securely attached to the cord fixture 110, the cord can be attached or fixed to an object or structure via the hook portion 130. In particular, a user can insert his/her finger into the eyelet 136 so as to manoeuvre the cord fixture 110 and the hook portion 130 in the desired manner before attaching the hook 132 to an attachment point on an object or structure. If the opposite end of the cord is fixed, the handle 134 conveniently allows a user to easily control the orientation and position of the cord fixture 110 and hook portion 130 against tension in the cord.

To release the cord from the cord fixture 110, the end portion of the cord is simply forced out of the enlarged circular end portion 120 and the neck portion 118 of the hollow body 112 by a pulling force. Once released from the slot 116, the cord can be pulled out of the hollow body 112 from the second end 140 to the first end 138.

Advantageously, the enlarged circular end portion 120 of the slot securely retains the cord therein so as to prevent accidental dislodgement of the cord when the cord is in its fixed condition. Further, the slot 116 is advantageously configured to provide a user with sensory feedback (i.e. tactile feedback) as the cord is received in the enlarged end portion 120 so as to indicate that the cord has been inserted into the correct locking position.

Without the enlarged circular end portion 120 (i.e. if the slot 116 finished at the end of the neck portion 118), it would be difficult to assess whether the cord is securely held in the slot 116. In some instances, a user may not have enough strength to pull the cord as far back along the slot 116 as necessary to properly secure the cord in the slot 116, which may cause the cord to become undesirably dislodged from the slot and the cord fixture. Further, a slot without enlarged circular end portion 120 may not provide sufficient grip to retain the cord therein. Indeed, the enlarged circular end portion 120 can be sized to match or closely match the diameter of a standard and commonly used bungee cord such that the side walls 122a, 122b of the enlarged circular end portion 120 firmly engage and hold the cord. The narrow pinch point 126 also facilitates in securing the cord within the enlarged circular end portion 120.

Moreover, the enlarged end portion evenly distributes the stresses and strains in the body of the cord fixture when the cord is under tension. Without the enlarged circular end portion 120, a high level of stress and strain will be concentrated at the pinch point 126 of the slot 116. After repeated use, such high levels of stress and strain would increase wear and tear of the cord fixture and reduce its operating life. In some instances, such high levels of stress and strain concentrated at the pinch point 126 may cause the hollow body 112 of the cord fixture to crack and break. To achieve the necessary toughness and durability, tougher, stronger and/or more material is required to make a cord fixture without enlarged circular end portion 120 (in comparison to a cord fixture having an enlarged circular end portion 120 as described herein), which increases the cost of manufacture.

Figure 12:
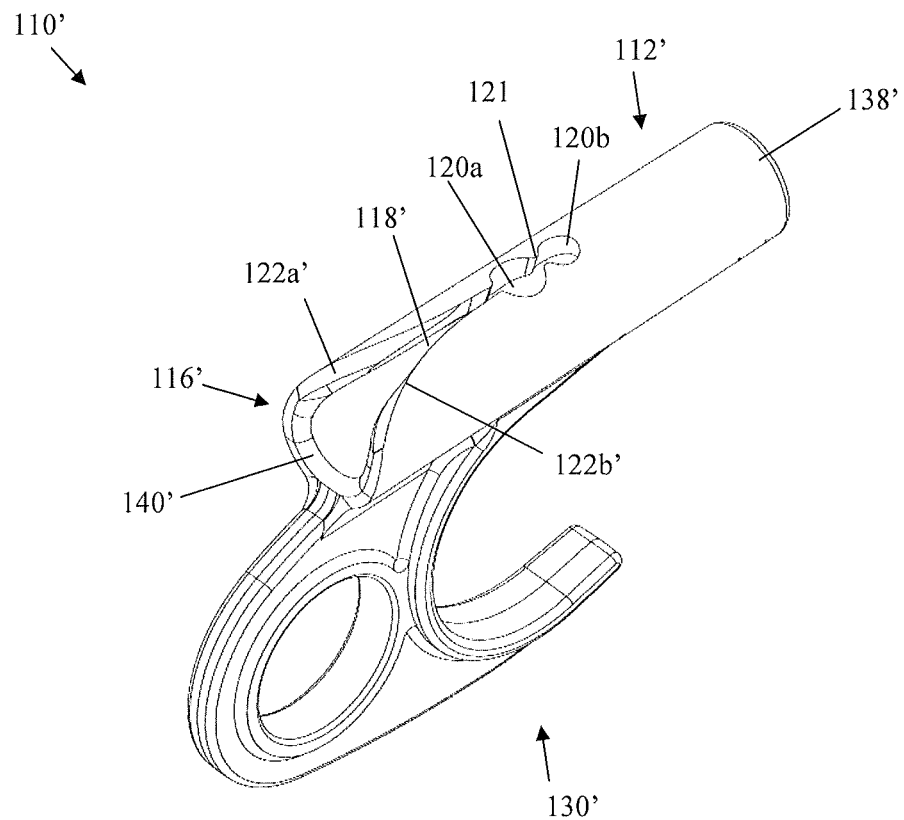
FIG. 12 is a perspective view of a cord fixture according to another embodiment of the present invention.

FIG. 12 illustrates a cord fixture 110' according to another embodiment of the invention. In FIG. 12, like numerals refer to like features previously described.

The cord fixture 110' is similar to cord fixture 110 and operates in a similar manner. The cord fixture 110' is different to cord fixture 110 of FIG. 11 in that the slot 116' includes a neck portion 118 and two circular portions 120a, 120b separated by a narrow portion 121. The two circular portions 120a, 120b, are arranged in series along a lengthwise direction of the slot 116'. Circular portion 120a has a larger diameter than circular portion 120b.

The two circular portions 120a, 120b advantageously allow the cord fixture 110' to be attachable to cords of two different diameters. The narrow portion 121 effectively creates a second pinch point between the two circular portions 120a, 120b so that a cord can be securely retained in either circular portion 120a or 120b.

When using cord fixture 110', a cord can be attached to the cord fixture 110' by first inserting the cord into the bore of the hollow body 112'. Then, an end portion of the cord near the second end 140' of the hollow body is orientated in a direction transverse to the axis of the hollow body 112' and inserted into slot 116'. The neck portion 118' of the slot 116' then guides the cord into the circular portion 120a. If the diameter of the cord generally matches the diameter of circular portion 120a, the cord is then securely retained in circular portion 120a. However, if the diameter of the cord is smaller than the diameter of circular portion 120a such that the edges 122a, 122b of circular portion 120a do not properly engage and hold the cord, the cord is pulled further into circular portion 120b. As circular portion 120b has a smaller diameter than circular portion 20a, the cord can be securely retained in circular portion 120b.

Once the cord is securely attached to the cord fixture 110', the cord can be attached or fixed to an object or structure via the hook portion 130' in the same manner as that previously described.

To release the cord from the cord fixture 110', the end portion of the cord is simply forced out of the corresponding circular portion 120a, 120b and the neck portion 118 of the hollow body 112' by a pulling force. Once released from the slot 116', the cord can be pulled out of the hollow body 112'.

Advantageously, the cord fixture 110' can accommodate two cords of different diameters. As described, a first cord with a larger diameter can be retained in circular portion 120a and a second cord with a smaller diameter can be retained in circular portion 120b.

In other embodiments of the invention, the cord fixture 110' may have more than two circular parts 120a, 120b. The cord fixture 110' may have several circular parts arranged in series in a manner similar to that shown in FIG. 12. The circular parts would have decreasing diameter towards the first end 138' of the hollow body 112'.

In another embodiment of the invention, the two or more circular parts of the cord fixture 110' may have the same diameter such that multiple cord portions can be retained simultaneously in cord fixture 110'.

Figure 13A:
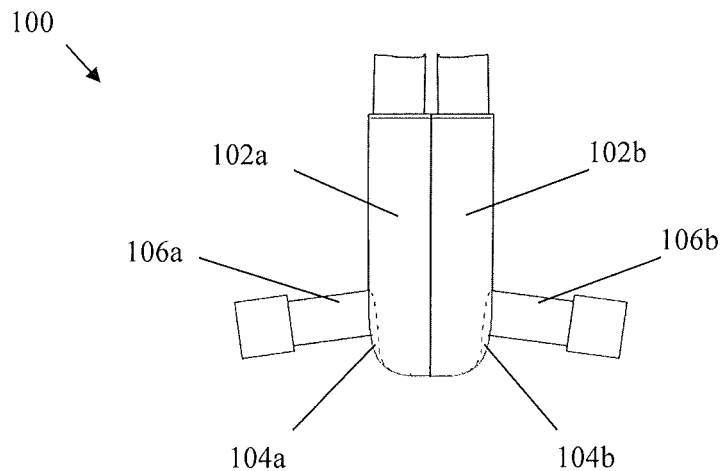
FIG. 13a is a side view of a cord fixture according to another embodiment of the present invention.

FIG. 13*a* illustrates a cord fixture 100 according to a further embodiment of the invention. The cord fixture 100 includes two hollow tubular portions 102*a*, 102*b*. Each tubular portion 102*a*, 102*b* includes a side wall defining a slot 104*a*, 104*b*. Each slot 104*a*, 104*b* may be configured in the same or a similar manner as the slots 16, 16' shown in FIGS. 1 and 2.

Each tubular portion 102*a*, 102*b* and the corresponding slot 104*a*, 104*b* operates with and retains a cord portion in the same manner as hollow body 12, 12' described above with reference to FIGS. 1 and 2. As shown in FIG. 3*a*, a first cord 106*a* can be threaded through the hollow tubular portion 102*a* and guided though a neck portion of the slot 104*a* to be received and retained in an enlarged end portion of the slot 104*b*. Similarly, a second cord 106*b* can be threaded through the hollow tubular portion 102*b* and guided though a neck portion of the slot 104*b* to be received and retained in an enlarged end portion of the slot 104*b*.

Figure 13B:
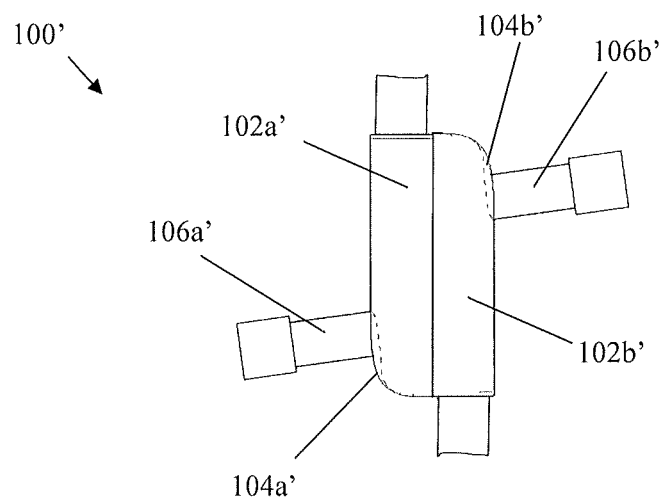
FIG. 13b is a side view of a cord fixture according to a further embodiment of the present invention.

FIG. 13*b* illustrates a cord fixture 100' according to another embodiment of the present invention. Like references in FIG. 3*b* refer to like features previously described in FIG. 3*a*.

The cord fixture 100' operates according to the same principles as cord fixture 100. However, the orientation of the hollow tubular portion 102*b*' is changed such that the slots 104*a*' and 104*b*' are arranged on opposite ends of the cord fixture 100' and facing opposite directions.

Advantageously, cord fixtures 100, 100' can be used to retain two cords 106*a*, 106*b* extending from the same direction or opposite directions.

In other embodiments, a cord fixture 100 may include more than two hollow tubular portions 102 to retain more than two cord portions 106.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of that term such as "comprises" or "comprising" are used herein to denote the inclusion of a stated integer or integers but not to exclude any other integer or any other integers, unless in the context or usage an exclusive interpretation of the term is required.

Reference to prior art disclosures in this specification is not an admission that the disclosures constitute common general knowledge.

The claims defining the invention are as follows:

1. A cord fixture for attachment to a cord, the cord fixture including:
   a. an elongate body having at least one side wall defining a hollow portion for receiving the cord therethrough so as to allow the cord fixture to slide along the cord,
   b. a V-shaped slot in the at least one side wall for retaining the cord therein when the cord is in a fixed condition, the slot extending parallel to over a portion of the length of a bore, the V-shaped slot including:
      i. an entry end in communication with the hollow portion and an engagement end,
      ii. a converging portion extending from the entry end to an engagement end, and
      iii. an enlarged end portion for engaging the cord at the engagement end; and,
   c. a fastener portion extending from the elongate body to allow the cord fixture to be attached to an object,
   wherein the converging portion of the V-shaped slot being configured to guide the cord into the enlarged end portion such that the cord can be releasably retained within the enlarged end portion, and the cord released from the enlarged end portion by movement of the cord back through the converging portion and toward the entry end of the slot.

2. The cord fixture as claimed in claim 1, wherein the hollow member is an elongate tube.

3. The cord fixture according to claim 1, wherein the elongate body is slidable along the cord when the cord is in an unfixed condition.

4. The cord fixture according to claim 1, wherein the converging portion defines a pinch point, the pinch point being configured to prevent the cord from being dislodged from the enlarged end portion when the cord fixture is in the fixed condition.

5. The cord fixture according to claim 1, wherein the enlarged end portion is generally circular.

6. The cord fixture according to claim 1, wherein the enlarged end portion of the V-shaped slot includes two or more circular parts having a narrowed portion therebetween.

7. The cord fixture as claimed in claim 6, wherein the two or more circular parts are located in series along a lengthwise direction of the V-shaped slot.

8. The cord fixture as claimed in claim 6, wherein a first circular part located immediately adjacent the converging portion is larger in diameter than a second circular part located immediately adjacent the first circular part.

9. The cord fixture as claimed in claim 6, wherein two or more circular parts have the same diameter.

10. The cord fixture according to claim 1, wherein the at least one side wall defines two or more slots, each slot being configured for retaining a cord portion therein.

11. The cord fixture as claimed in claim 1, wherein the fastener portion includes at least one hook portion.

12. The cord fixture as claimed in claim 11, wherein each hook portion has an arc angle of greater than 180°.

13. The cord fixture as claimed in claim 11, where in the fastener portion includes a handle including an eyelet sized to receive a portion of a finger.

14. The cord fixture as claimed in claim 1, wherein the fastener portion projects from a side of the elongate body opposite to the slot.

15. The cord fixture according to claim 1, wherein the cord fixture is moulded in one piece.

16. The cord fixture according to claim 1 attached to a tonneau cover for a trailer or vehicle, the cover comprising a flexible sheet, and a plurality of cords, each cord being connected to the flexible sheet and having a cord fixture associated therewith, the cords and cord fixtures being configures to allow a separation between the flexible sheet and the cord fixtures to be varied, wherein each cord fixture is adapted for engagement with the trailer or vehicle to hold the tonneau cover relative to the trailer or vehicle.

17. A method of attaching a cord fixture to a cord as claimed in claim 1, the method including:
   inserting the cord into the V-shaped slot in a side wall of the cord fixture, guiding the cord via the converging portion of the V-shaped slot into an engagement portion of the V-shaped slot, and releasably retaining the cord within the enlarged end portion of the V-shaped slot wherein the cord is released from the enlarged end portion by movement of the cord back through the converging portion of the slot and toward the entry end of the slot.

18. A kit for assembling a tonneau cover for a trailer or vehicle, the kit comprising:
  A. a flexible sheet, and
  B. a plurality of cords for attachment to the flexible sheet, each cord having a cord fixture associated therewith, each cord fixture including:
    a. an elongate body having at least one side wall defining a hollow portion for receiving the cord therethrough so as to allow the cord fixture to slide along the cord,
    b. a V-shaped slot in the at least one side wall for retaining the cord therein when the cord is in a fixed condition, the slot extending parallel to over a portion of the length of a bore, the V-shaped slot including:
      i. an entry end in communication with the hollow portion and an engagement end,
      ii. a converging portion extending from the entry end to an engagement end,
      iii. an enlarged end portion for engaging the cord at the engagement end; and,
    c. a fastener portion extending from the elongate body to allow the cord fixture to be attached to an object,
  wherein the converging portion of the V-shaped slot being configured to guide the cord into the enlarged end portion such that the cord can be releasably retained within the enlarged end portion, and the cord released from the enlarged end portion by movement of the cord back through the converging portion and toward the entry end of the slot, and
  wherein the cords and cord fixtures being configured to allow a separation between the flexible sheet and the cord fixture is adapted for engagement with the trailer or vehicle to hold the tonneau cover relative to the trailer or vehicle, and wherein each cord fixture has a handle for receiving a portion of a user's hand so as to assist the user to position each fastener relative to the trailer or vehicle.

* * * * *